(12) United States Patent
Sanders et al.

(10) Patent No.: US 11,089,430 B1
(45) Date of Patent: Aug. 10, 2021

(54) SYSTEM AND METHODS FOR EFFICIENT PROCESSING AND MIXING OF AUDIO RECEIVERS FROM MULTIPLE SOURCES

(71) Applicant: Zaxcom, Inc., Pompton Plains, NJ (US)

(72) Inventors: Glenn Norman Sanders, Franklin Lakes, NJ (US); Howard Glenn Stark, Sparta, NJ (US)

(73) Assignee: Zaxcom, Inc., Pompton Plains, NJ (US)

( * ) Notice: Subject to any disclaimer, the term of this patent is extended or adjusted under 35 U.S.C. 154(b) by 0 days.

(21) Appl. No.: 16/843,608

(22) Filed: Apr. 8, 2020

(51) Int. Cl.
| | |
|---|---|
| *H04R 5/02* | (2006.01) |
| *H04S 7/00* | (2006.01) |
| *H04L 29/06* | (2006.01) |
| *G06F 3/0482* | (2013.01) |
| *H04S 1/00* | (2006.01) |
| *G06F 3/0485* | (2013.01) |

(52) U.S. Cl.
CPC ........... *H04S 7/307* (2013.01); *G06F 3/0482* (2013.01); *H04L 65/601* (2013.01); *H04S 1/007* (2013.01); *H04S 7/40* (2013.01); *G06F 3/0485* (2013.01)

(58) Field of Classification Search
CPC ...................................................... H04R 5/02
See application file for complete search history.

(56) References Cited

U.S. PATENT DOCUMENTS

| | | | | |
|---|---|---|---|---|
| 4,879,751 A | * | 11/1989 | Franks ................... | H04H 60/04 381/119 |
| 5,450,075 A | * | 9/1995 | Waddington ............ | G05G 1/10 340/870.28 |
| 5,940,521 A | * | 8/1999 | East ....................... | H04H 60/04 381/119 |
| 6,438,241 B1 | * | 8/2002 | Silfvast ................... | H04H 60/04 381/119 |
| 7,711,443 B1 | * | 5/2010 | Sanders ................. | G08C 25/02 700/94 |
| 2005/0207597 A1 | * | 9/2005 | Kageyama ............. | H04H 60/04 381/119 |
| 2013/0182871 A1 | * | 7/2013 | Yamazaki ................ | H03G 3/02 381/109 |
| 2013/0188810 A1 | * | 7/2013 | Okabayashi ............. | H04R 3/00 381/119 |
| 2013/0201398 A1 | * | 8/2013 | Radin ..................... | H04H 60/04 348/552 |
| 2014/0270255 A1 | * | 9/2014 | Webb ...................... | H03G 7/002 381/107 |

(Continued)

*Primary Examiner* — Olisa Anwah
(74) *Attorney, Agent, or Firm* — Rita C. Chipperson; Chipperson Law Group, P.C.

(57) ABSTRACT

Mixer devices for efficiently processing multitrack audio including: at least one audio input port for receiving local audio from an audio input device as at least one local audio input; a memory; a user interface, the user interface including at least one adjuster; and at least one control unit electrically coupled to said receiver, said transmitter; said at least one audio input port, said memory, and said user interface; the at least one control unit programmed to control local gain of the local audio and local mixing. In another aspect, the mixer devices also remotely control the gain of bodypack receivers capable of receiving local audio input in analog or digital form. A novel display is also incorporated to facilitate such control surrounding the adjustor capable of performing the control.

14 Claims, 11 Drawing Sheets

(56) References Cited

U.S. PATENT DOCUMENTS

| | | | |
|---|---|---|---|
| 2015/0078584 A1* | 3/2015 | Moon | H03G 3/02 |
| | | | 381/104 |
| 2015/0207478 A1* | 7/2015 | Duwenhorst | H03G 3/3005 |
| | | | 381/104 |
| 2016/0266867 A1* | 9/2016 | Olesh | G06F 3/165 |

* cited by examiner

SYSTEM AND METHODS FOR EFFICIENT PROCESSING AND MIXING OF AUDIO RECEIVERS FROM MULTIPLE SOURCES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Embodiments of the present invention generally relate to systems and methods of efficient processing and mixing of audio received from multiple sources. More specifically, the present invention relates to systems and methods of efficient processing and mixing of audio received from one or more sources including a mixer that is relatively small and lightweight due to the efficiency of the mixer user interface and other features.

Many systems and methods have been created to record performance audio. Some such systems include a multi-track audio mixer, which may or may not include an integral recorder, wired to one or more microphones wherein each microphone is a single track. Typically, one or more performers performing on a sound stage are recorded by one or more microphones that are directly wired to a recorder or a multi-track mixer that is, optionally directly wired to a recorder. The multi-track mixer combines the single track of audio received from each microphone to create one multi-track audio file.

Other such systems include a multi-track audio mixer that receive audio wirelessly from one or more wireless transmitters. Such wireless transmitters may take the form of portable, body wearable, battery powered body packs that are worn by each performer. Body packs are typically very small in size such that they may be easily hidden on the body of a performer or the like. Typically, the audio mixer receives each performer's audio from the performer's respective body pack via an analog or digital wireless transmission in addition to receiving local audio at the mixer in either a digital or analog form. These various sources of audio may then be combined to create one multi-track audio file, which may then be optionally recorded.

Typically, the quality and/or content of audio received or recorded by an audio mixer or recorder, respectively, is modified within the audio mixer and/or recorder and is manually mixed to form a single soundtrack that includes sound from all of the independent sound sources. This soundtrack is formed to enhance the combination of a visual recording and the mixed soundtrack. That is, a user of the audio mixer or recorder listens to the received audio and makes various adjustments to the audio receiving or recording circuitry to improve the quality thereof. One such adjustment is gain, or amplification, of the received audio. In some such systems, the change in gain or amplification of the audio is made by modifying one or more amplification circuits located in the audio mixer and/or recorder, and these adjustments may be made locally at the audio mixer and/or recorder via knobs, slides, and the like.

Some such systems include hardware controls, software controls, or a combination thereof, wherein the hardware may include potentiometers. Some such systems are known wherein a resistive potentiometer is utilized to control one function at a time, thereby requiring the use of multiple such potentiometers in order to make the necessary adjustments to obtain a viable audio mix, particularly in situations in which there are multiple sources of audio. Such adjustments may include, but are not limited to, fader levels and input gain for each track of audio to be included in the soundtrack. Current systems require significant physical space to house and present an organized and useful interface to a user in a portable, body wearable, battery-powered mixer or mixer/recorder. That is, the sometimes large number of audio sources required to obtain a quality soundtrack require a large number of controls to be quickly accessible, with easy and organized manipulation of the audio parameters required to obtain a quality soundtrack from a plurality of audio sources.

BRIEF SUMMARY OF THE INVENTION

Disclosed is a mixer device for efficiently processing multitrack audio including: 1) at least one audio input port for receiving local audio from an audio input device as at least one local audio input; 2) a memory; 3) a user interface, the user interface including at least one adjuster; and 4) at least one control unit electrically coupled to said receiver, said transmitter; said at least one audio input port, said memory, and said user interface; the at least one control unit programmed to control local gain of the local audio and local mixing.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings.

DETAILED DESCRIPTION OF THE INVENTION

Figure 1:
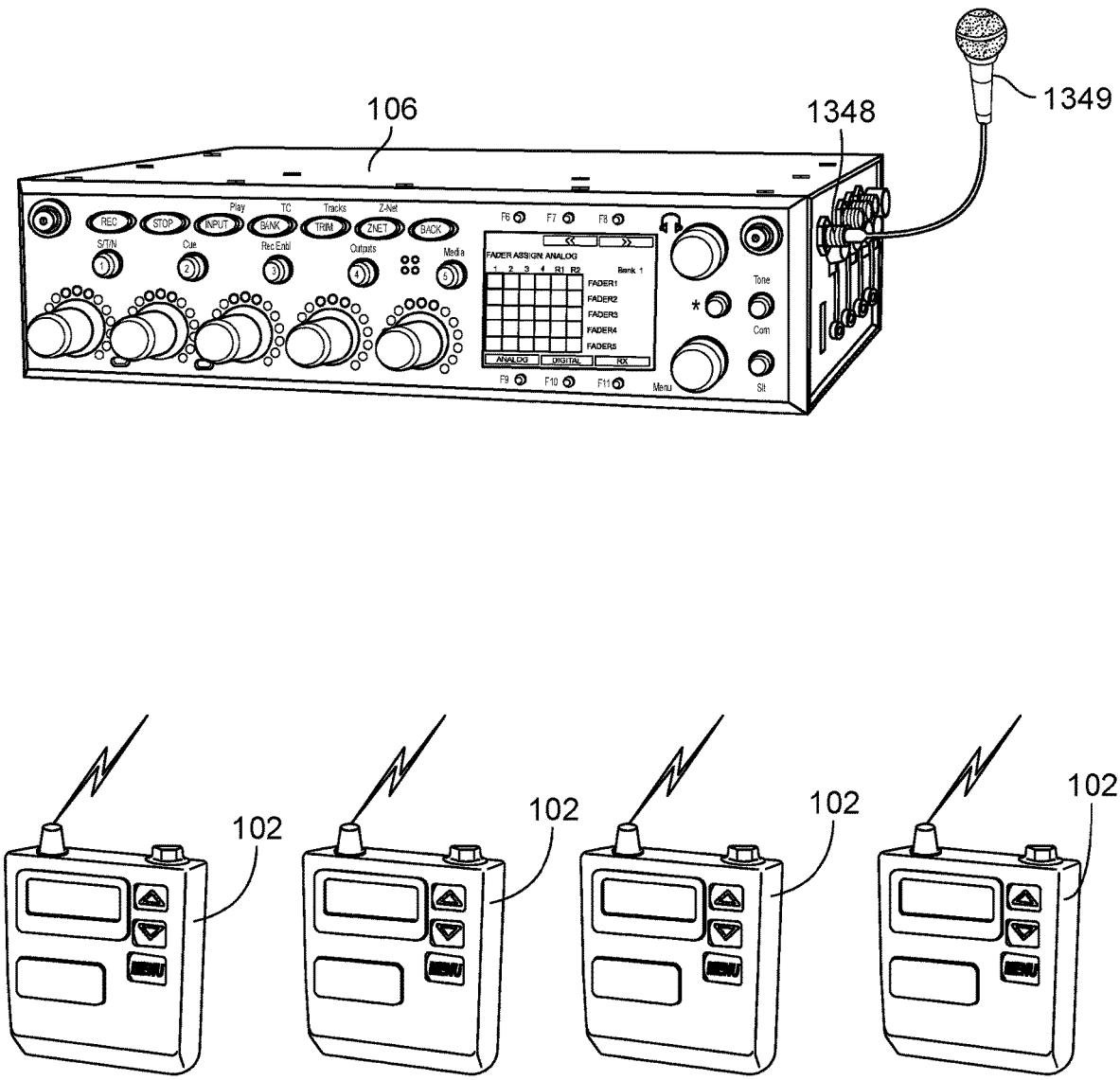
FIG. 1 depicts the components of an audio processing system in accordance with one embodiment of the present invention including, inter alia, local audio devices and a mixer.

Referring first to FIG. 1, depicted is audio processing system 100 in accordance with one embodiment of the present invention. Audio processing system 100 records audio events, such as performances, movie takes, etc. having one or more performers, wherein the audio may be received wirelessly (e.g., from a local audio device) or from a wired connection (e.g., a microphone). In the embodiment of the present invention depicted in FIG. 1, audio processing system 100 includes local audio devices 102 and mixer 106. In the depicted embodiment, mixer 106 includes an integral recorder, however, this is not required in order to implement the systems and methods of the present invention. In one embodiment, mixer 106 includes an RF transmitter capable of transmitting one or more of digital commands and audio to one or more other components of audio processing system 100. Additionally, mixer 106 may be equipped with the capability of remotely controlling local audio devices 102 to perform tasks including, but not limited to, changing the value of the input gain of the respective local audio devices 102.

Both live and replayed audio transmitted by local audio devices 102 may be received, and optionally recorded, at mixer 106. Mixer 106 receives the wireless RF signals (e.g., modulated RF carrier signals) generated by all active local audio devices 102 as well as any hardwired signals such as those received from a microphone, which may be analog or digital, such as microphone 1349 coupled to input port 1348.

Figure 3A:
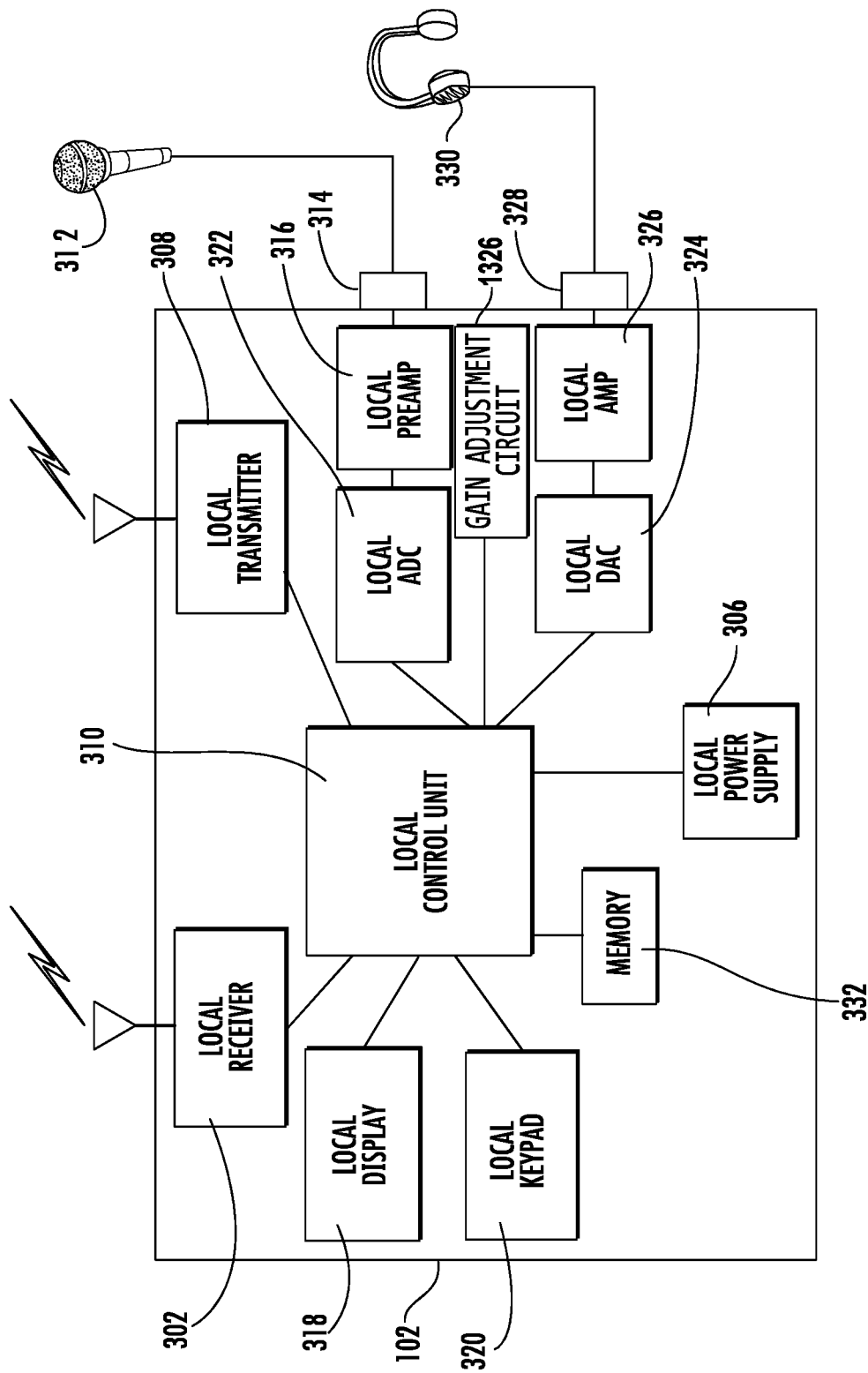
FIG. 3A depicts a block diagram of the internal components of a local audio device in accordance with one embodiment of the present invention.

Turning next to FIG. 3A, depicted is a block diagram of one embodiment of local audio device 102 in accordance with the present invention. In one aspect of the present invention, local audio devices 102 are digital, wireless audio transceivers. Such audio devices may be manufactured in the form of body-packs, such as those typically worn by news announcers, performers, and the like and that may be easily hidden on the body of a wearer. In the depicted embodiment, local audio device 102 includes, inter alia, local receiver 302, local power supply 306, local transmitter 308, local control unit 310, local audio input device 312, local audio input device port 314, local preamp 316, local display 318, local keypad 320, local ADC 322, local DAC 324, local amp 326, local audio output device port 328, local audio output device 330, and memory 332.

Local transmitter 308 also allows audio generated locally at local audio device 102 to be transmitted to the other components of audio processing system 100. Such audio may be received from an audio input device such as local audio input device 312 via local audio input device port 314. Local audio input device 312 may be any type of commercially available audio input device such as a microphone and local audio input device port 314 may be any commercially available audio input device port that is compatible with local audio input device 312 and the internal components of local audio device 102. The received audio as well as any digital signals (e.g., microphone input level, line input level, etc.) are then buffered and/or amplified by local preamp 316 and are converted from analog to digital by local ADC 322 such that the audio may be read in digital form by local control unit 310. This audio may then be processed and sent via local transmitter 308 in either analog or digital form. If the audio is to be sent in analog form, local control unit 310 may be equipped with an on-board DAC or an independent DAC may be incorporated in local audio device 102 without departing from the scope of the present invention. Or, alternatively, analog audio received from local audio input device 312 may be passed directly to local transmitter 308 for transmission in analog form to the other components of the audio processing system. In such embodiments, local transmitter 308 may be equipped with a frequency modulation ("FM") modulator or the like. Furthermore, in such embodiments, although the analog audio is passed through to local transmitter 308, the audio signal may be additionally converted to digital form for local recording of the received audio. In yet another alternate embodiment, audio may be transmitted and recorded in analog form thereby eliminating local ADC 322.

Figure 7:
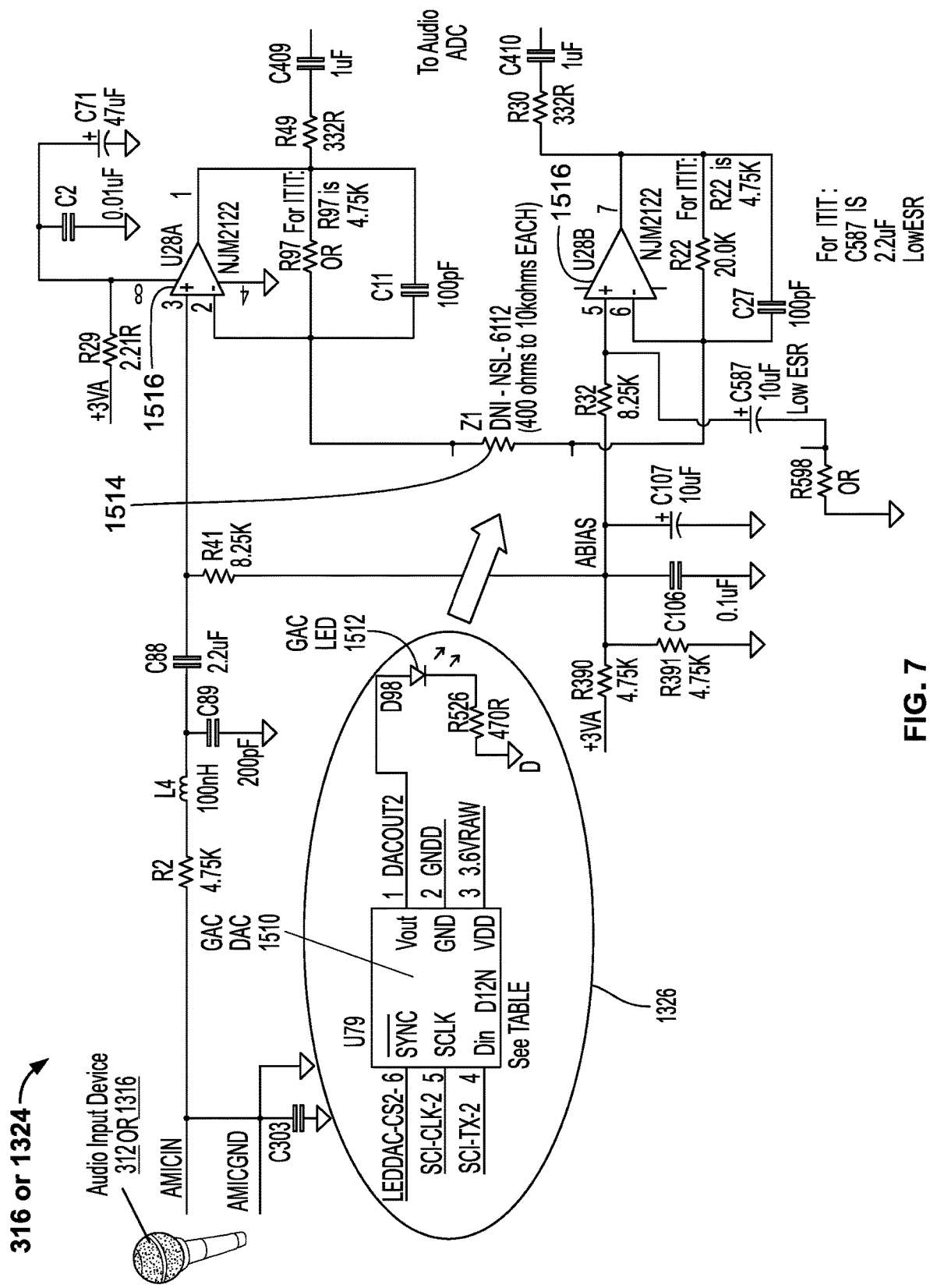
FIG. 7 depicts exemplary gain adjustment and preamplifier circuit diagrams.

The gain of audio received from audio input device 312 via audio input device port 314 may be adjusted via an exemplary gain adjustment circuit such as gain adjustment circuit 1326 as depicted in FIG. 7. When local control unit 310 wirelessly receives the desired gain setting as described in greater detail below with respect to FIG. 8, it converts the received setting to a digital command to be transmitted to gain adjustment circuit ("GAC") DAC 1510. The digital command may be derived from a look up table or the like that equates incoming desired gain settings to corresponding GAC DAC 1510 commands. The GAC DAC 1510 receives its digital command and converts it to an analog signal that is applied to one or more GAC LEDs 1512. GAC LEDs 1512 may be any commercially available LEDs such as, but not limited to, a Lumex SML-LX0603SRW LED. The light generated by GAC LEDS 1512 varies based upon the digital command received from local control unit 1310.

The light generated by GAC LEDs 1512, as well as the audio received locally from audio input device 312 is received by local preamp 316. In this embodiment of the present invention, local preamp 216 is a preamplification circuit. This circuit includes, inter alia, one or more photocells 1514 and a plurality of amplifiers 1516. Photocells 1514 may be any commercially available photocell such as, but not limited to, cadmium sulfide ("CdS") photocells such as Silonex NSL-6112 photoconductive cells. Each photocell 1514 varies its resistance between two terminals based upon the amount of photons it receives. This varying resistance varies the analog signals applied to the input terminals of the plurality of amplifiers 1516 to vary the amplification of the audio received from audio input device 312 as desired by a user of audio processing system 100. The amplified audio, as output by amplifiers 1516, is then transmitted to local ADC 322. Local ADC 322 converts the amplified audio signals to digital form for transmission to local control unit 310. It should be noted that the depicted gain adjustment and preamplification circuits are merely exemplary and any other compatible hardware or software capable of adjusting gain and/or amplifying analog signals may be substituted without departing from the scope of the present invention.

In some embodiments of the present invention, local control unit 310 may be a digital signal processor such as Texas Instruments part number TMS320C5509A. However, the present invention is not so limited. Any combination of hardware and software may be substituted for any component described herein without departing from the scope of the present invention.

Local receiver 302 allows commands received from other components of audio processing system 100 (e.g., mixer 106) to be received locally at local audio device 102. Such commands may be received in either analog or digital form at local receiver 302. However, if the command is to be received in analog form, local control unit 310 may be equipped with an on-board ADC or an independent ADC may be incorporated in local audio device 102 without departing from the scope of the present invention to allow local control unit 310 to receive the command in digital form. Local receiver 302 may be virtually any receiver compatible with the other components of local audio device 102. In some embodiments, the local receiver 302 and the local transmitter 308 are one component which may be, but is not limited to, a Micrel Semiconductor MICRF505 Radio-Wire® transceiver.

Local audio output device 330 may be any type of commercially available audio output device such as headphones, speakers, and the like, and local audio output device port 328 may be any commercially available audio output device port that is compatible with local audio output device 330 and the internal components of local audio device 102. Memory 332 of local audio device 102 locally stores data utilized and processed by local control unit 310 (e.g., digital commands) and may, optionally, store audio data in one or more files. In one aspect of the present invention, local control unit 310 receives recordable audio from local audio input device 312, which may be worn by the performer and connects to local audio device 102 at local audio input device port 314. Memory 332 of local audio device 102 may also locally store data including, but not limited to, commands processed by local control unit 310 in one or more data files. In one aspect of the present invention, local control unit 310 receives commands wirelessly from mixer 106, which may be worn by a sound engineer or the like that is mixing the audio generated at local audio device 102 with other sources of audio. Simultaneous with the local recording of audio received from local audio input device 312, this audio may also be transmitted through local transmitter 308 to mixer 106 to allow the mixing and, optionally, recording of the audio event. In this scenario, mixer 106 may simultaneously record a multi-track recording of all of the single tracks of audio received from local audio devices 102, which are worn by the performers of the audio event.

Memory 332 may be virtually any type of commercially available removable or non-removable memory including, but not limited to, flash memory cards, compact flash memory cards, Universal Serial Bus ("USB") thumbdisks, and the like.

Local audio devices 102 also receive non-audio information (e.g., digital commands) from other components of audio processing system 100 via local receiver 302. For example, local audio devices 102 may receive gain adjustment commands or other information from mixer 106 through receiver 302.

Whenever adjustment of a local audio device setting such as gain is required, mixer 106 may transmit a digital command to the respective local audio devices 102 to adjust the gain value to the new desired value, which value may be stored in the respective memories 332. The digital command is received by local receivers 302, which transmit or relay the command to their respective local control unit 310. Thereafter, local control units 310 access and replace the values of the setting to be adjusted in the respective memory 332 and cause this new setting to be implemented.

Figure 3B:
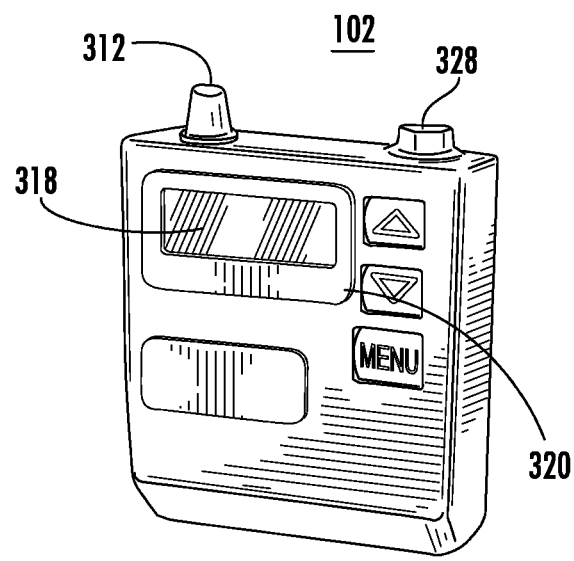
FIG. 3B depicts an external, front view of a local audio device in accordance with one embodiment of the present invention.

Local audio devices 102 may be bodypacks such as the local audio device 102 depicted in FIG. 3B. In such an embodiment, display 318 may be a small liquid crystal display ("LCD") or the like and keypad 320 may include a plurality of buttons that allow a user to perform functions including, but not limited to, those that relate to transmitter frequency, receiver frequency, microphone gain, high pass filter, group ID code, unit ID code, transmitter encryption code, and transmitter operating mode. For example, transmitter and receiver frequencies may be adjustable in predetermined frequency steps. Microphone gain may be adjusted (locally or remotely), which in turn adjusts the current setting of a preamp such as local preamp 316. Adjustment of the high pass filter may be incorporated to enable and disable, or otherwise adjust, the high pass audio filter of the audio input device such as audio input device 312.

When multiple local audio devices are incorporated in a group, each local audio device in the group may be assigned a group ID. Similarly, the unit ID identifies each specific local audio device within the group of local audio devices.

For local audio devices transmitting encrypted audio and data, the transmitter encryption code is set to match the encryption code of all receiving devices (e.g., a mixer). Correctly setting this code allows the receiving device to properly decrypt the received transmission, while preventing unauthorized users from recording the data.

The operating mode of each local audio device can encompass any one of a number of modes. For example, the operating modes may include USA or European modes, as well as stereo modes. Selection of a specific mode may alter settings such as transmitter bandwidth, audio sampling parameters, and the like.

Although many specific features and functions for the local audio devices have been delineated herein, other features and functions may be added or eliminated without departing from the scope of the present invention.

Additionally, handheld embodiments may include any one of a variety of commercially available batteries to function with the power supply 306 without departing from the scope of the present invention. Power supply 306 may be virtually any power component or combination thereof that is compatible with the other components of local audio device 102 including, but not limited to, a Texas Instruments TPS62000DGS Power Module alone or in combination with a Linear Technology LTC3402 Synchronous Boost Converter.

Figure 4A:
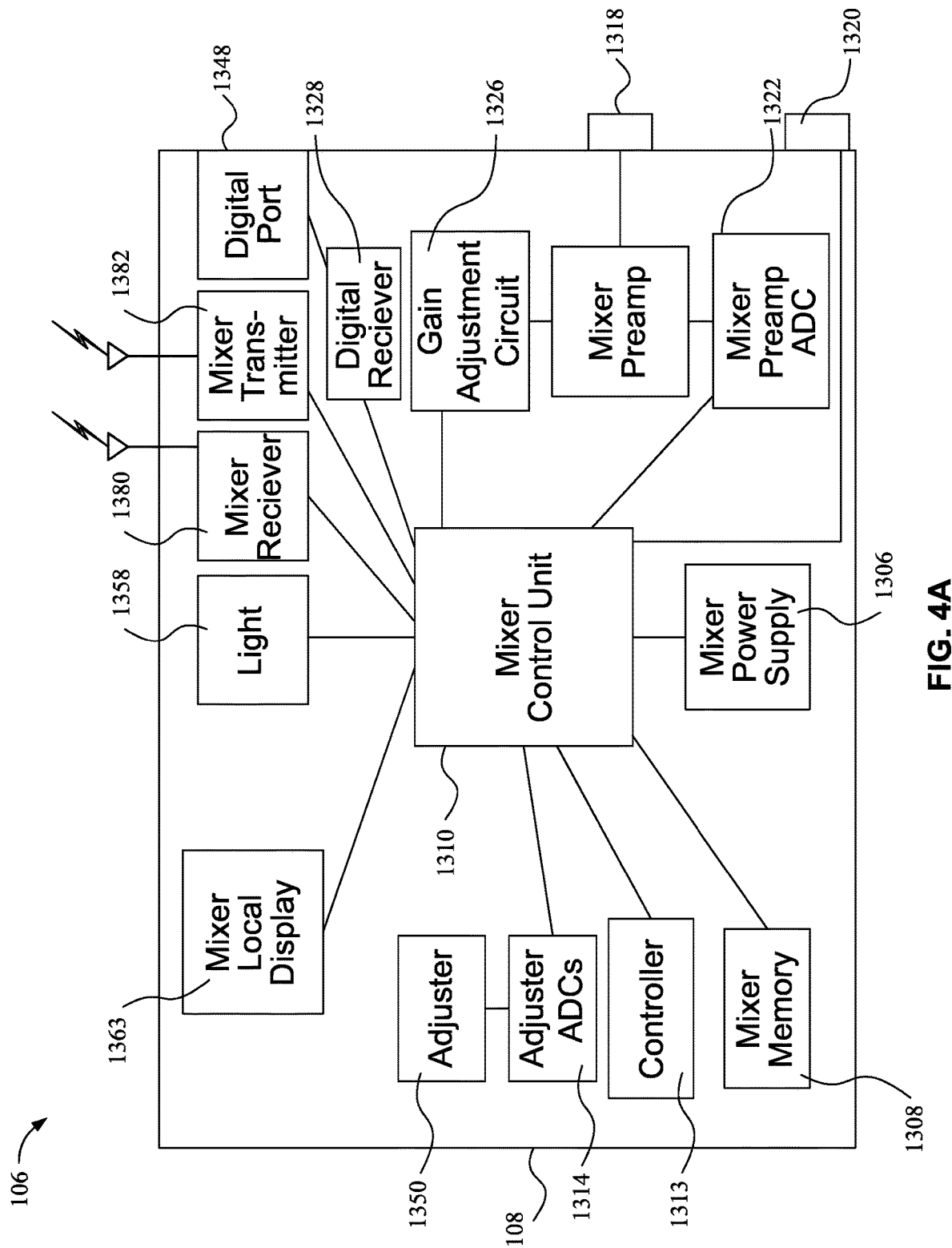
FIG. 4A depicts a block diagram of the internal components of a mixer in accordance with one embodiment of the present invention.
Figure 4B:
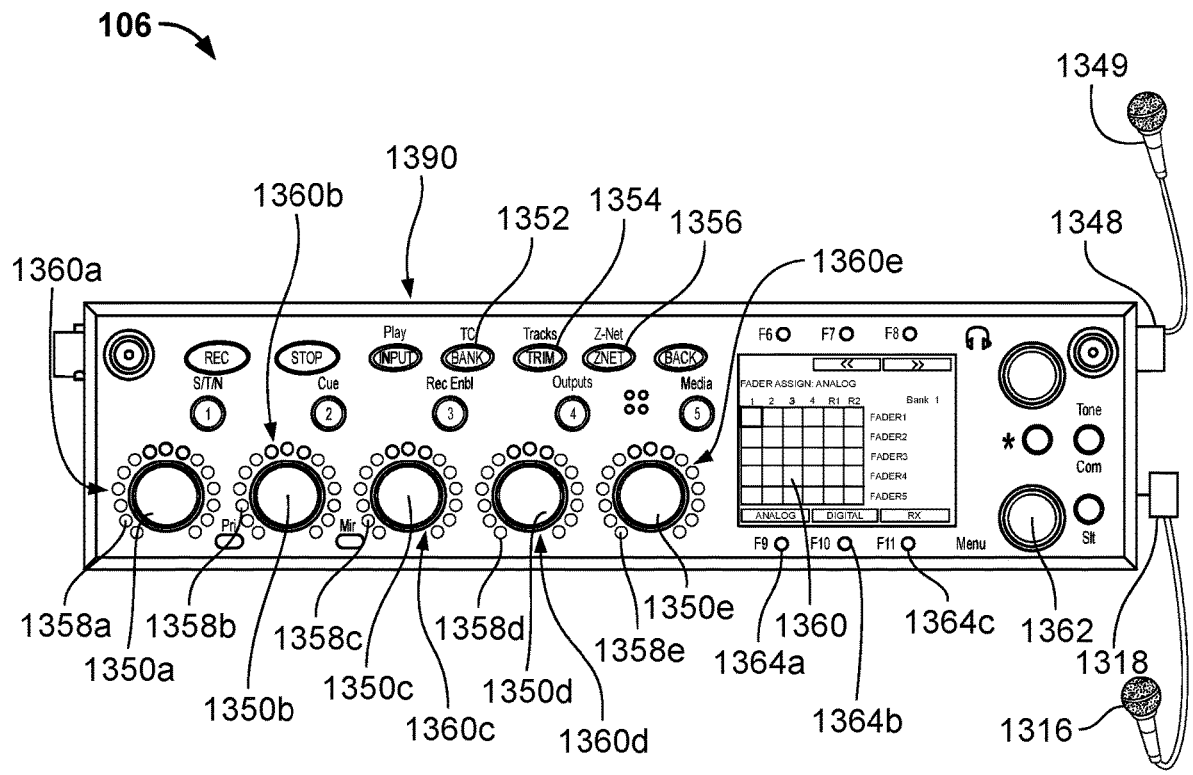
FIG. 4B depicts an external, front view of an exemplary mixer in accordance with one embodiment of the present invention.

Turning now to FIGS. 4A and 4B, depicted are a block diagram and a front view, respectively, of one embodiment of mixer 106 in accordance with the present invention. As best seen in FIG. 4A, the depicted embodiment of mixer 106 includes, inter alia, mixer power supply 1306, mixer memory 1308, mixer local control unit 1310, at least one adjuster 1350, at least one adjuster ADC 1314, at least one mixer audio input device port 1318, at least one mixer preamp ADC 1322, at least one mixer preamp 1324, at least one mixer DAC 1326, mixer local fader display 1360 including at least one light 1358, at least one mixer digital input device port 1348, a mixer receiver 1380, and a mixer transmitter 1382.

In some aspects, mixer power supply 1306 may be a 12V DC battery. Or, alternatively, or in addition to mixer power supply 1306, power supply can be an AC electric plug compatible with an electrical receptacle including, but not limited to, an SL Power Electronics PW174KB1203F01 AC adapter. Mixer power supply 1306 may be virtually any power component or combination thereof that is compatible with the other components of mixer 106.

Receiver 1380 allows audio received from other components of audio processing system 100 to be processed locally at mixer 106. Such audio may be received in either analog or digital form at mixer 106. However, if the audio is to be received in analog form, mixer control unit 1310 may be equipped with an on-board ADC or an independent ADC may be incorporated in mixer 106 without departing from the scope of the present invention to allow mixer control unit 1310 to receive the audio in digital form. In the depicted embodiment, a plurality of receivers 1380 are included and each channel of wirelessly received audio is received by mixer 106 via one of the receivers 1380, after which it is processed by mixer control unit 1310 and mixed with the audio of other channels to create a multi-track soundtrack.

Mixer transmitter 1382 performs various functions including transmission of setting values to the other components of audio processing system 100 such as, but not limited to, local audio devices 102. Such setting values may be received from mixer control unit 1310, after receipt from the user interface 1390. For example, mixer control unit 1310 may receive a gain adjustment intended to adjust the gain as it is received at one or more of the local audio devices from, for example, an adjustor 1350 (as described in greater detail herein). In this scenario, mixer control unit 1310 may transmit the new gain value to the respective local audio device(s) via mixer transmitter 1382 as also described in greater detail herein. This data may be sent via mixer transmitter 1382 in either analog or digital form. If the audio is to be sent in analog form, mixer control unit 1310 may be equipped with an on-board DAC or an independent DAC may be incorporated in mixer 106 without departing from the scope of the present invention. The gain of audio received from audio input device 312 via audio input device port 314 may be adjusted via an exemplary gain adjustment circuit such as gain adjustment circuit 1326 as depicted in FIG. 7. Mixer receiver 1380 and mixer transmitter 1382 may be individual components or a combined transceiver without departing from the scope hereof including, but not limited to, a Micrel Semiconductor MICRF505 RadioWire® transceiver.

Figure 5A:
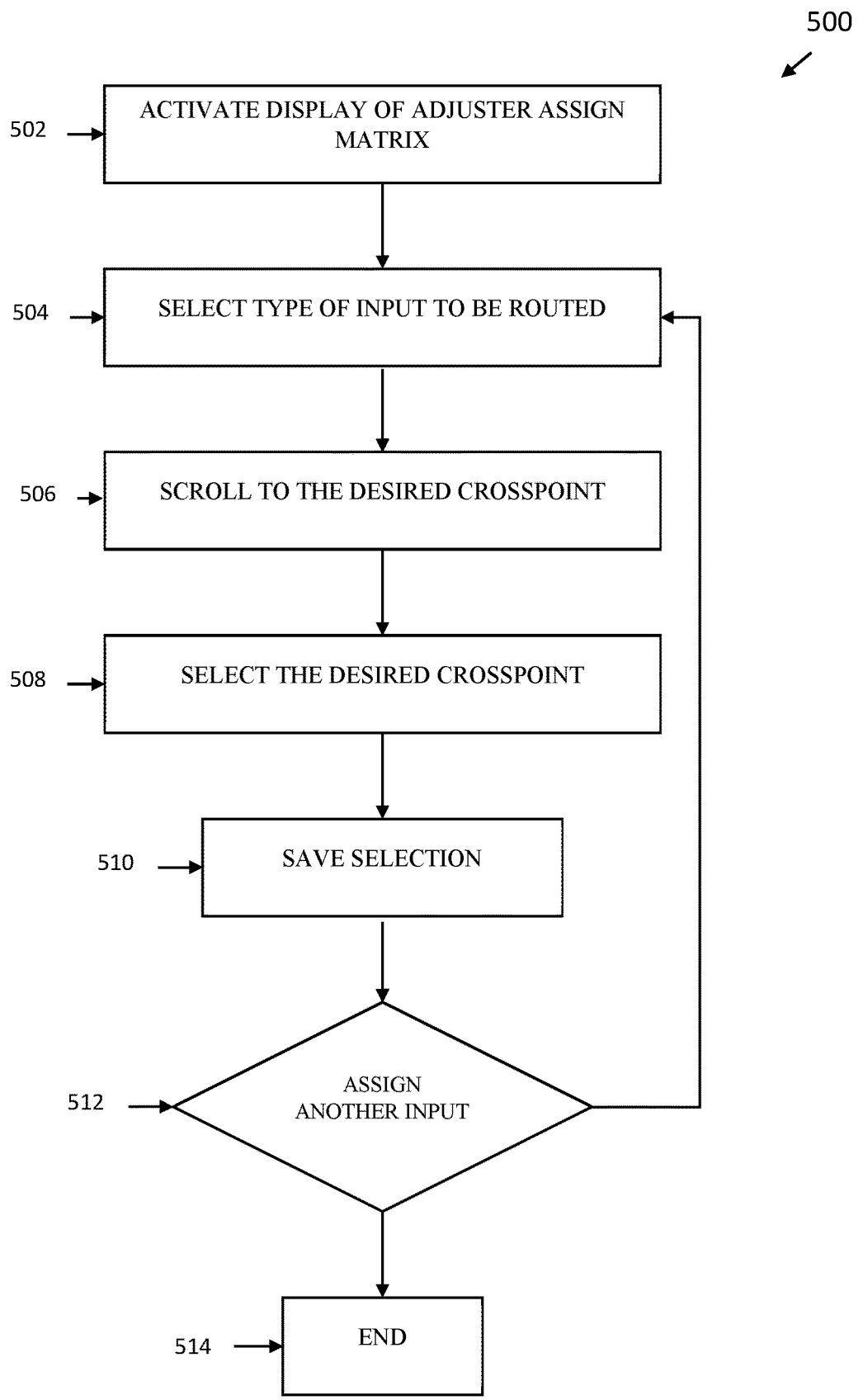
FIG. 5A depicts a process for assigning one or more audio inputs to one of a set of banks in accordance with one embodiment of the present invention.
Figure 6:
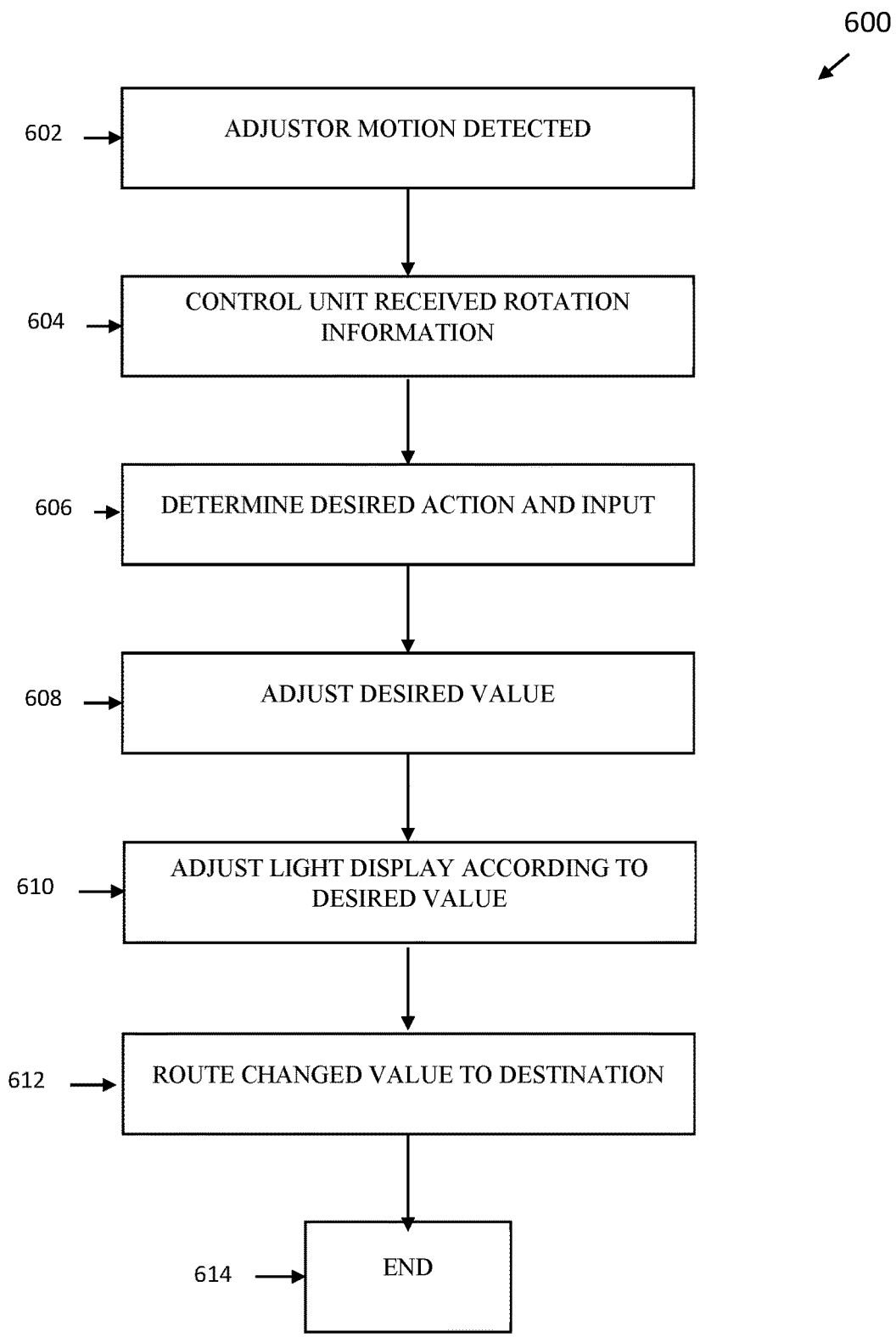
FIG. 6 depicts a process for controlling local mixing level, local input gain, or remote input gain in accordance with one embodiment of the present invention.

In some embodiments of the present invention, mixer local control unit 1310 is electrically coupled to the other components of mixer 106, and it is a digital signal processor programmed with software including, but not limited to, that depicted in FIGS. 5A and 6. A portion of the software executed by mixer local control unit 1310 causes the audio received from the plurality of audio input source (e.g., wirelessly or hardwired) to be manipulated by a user and combined to create a single soundtrack, often including a plurality of audio tracks although the systems and methods of the present invention are capable of being used with creation of a soundtrack having a single audio input.

Also, for example, mixer local control unit 1310 controls local mixing levels, local input gain, and the remote input gain of local audio devices. For example, mixer local control unit 1310 may be programmed with an algorithm capable of remotely controlling the amplification of audio received at local audio devices 102. In the depicted embodiment of the present invention, mixer local control unit 1310 is a digital signal processor such as a Texas Instruments TMS320C6713GDP digital signal processor, however, the present invention is not so limited. Any combination of hardware and software capable of executing processes such as those disclosed herein may be substituted for any component described herein without departing from the scope of the present invention.

Mixer memory 1308 is electrically connected to mixer local control unit 1310 and stores information therein including, without limitation, the value of settings adjusted by a user. In the depicted embodiment of the present invention, mixer memory 1308 is an SST25VF064C-80-4-S3AE-T as manufactured by SST Microelectronics. However, mixer memory 1308 may be virtually any type of commercially available removable or non-removable memory including, but not limited to, flash memory cards, compact flash memory cards, Universal Serial Bus ("USB") thumbdisks, and the like.

Referring now to FIG. 4B, depicted is one embodiment of a front control surface of mixer 106 in accordance with the present invention. Mixer 106 includes a plurality of adjusters 1350a through 1350e. In the depicted embodiment, adjusters 1350 are analog rotary encoders such as model no. PR11-0012 as manufactured by Top-UP, however, alternate devices including, without limitation, digital encoders may be substituted. Each analog encoder includes two (2) continuous potentiometers on each encoder shaft assembly, wherein the potentiometers are rotationally ninety (90) degrees out of phase relative to each other. The adjuster ADCs convert the analog signals received from the analog encoder to digital signals, and these digital signals are read by the mixer control unit 1310. The mixer control unit 1310 can sense the position of the respective adjuster by comparing the resistance of the two potentiometers to each other as the two outputs will occur at a specific position in the rotation of the encoder.

For example, in the depicted embodiment of the invention, each of adjuster ADC 1314 reads the analog signal from its respective potentiometer and translates it into a value in the range of zero to 4095. It then calculates the encoder orientation based upon the following formula:

$$\text{RESULT} = \text{arc tangent } (y/x),$$

wherein the RESULT will be in the range [−pi, +pi] radians; and $$\text{ORIENTATION} = (\text{RESULT} + pi) * 4095.0/(2*pi).$$

If the value of X equals zero, then the value of RESULT will be set to 4095 to avoid dividing by zero. However, alternate methods of calculating orientation may be substituted without departing from the scope hereof.

In alternate embodiments, digital encoders may be incorporated, the number of pulses generated by the rotation of the digital encoder are counted, and the phase of the two encoder outputs determine the direction of motion with the number of pulses counted determining the distance. In any case, the adjustors 1350 are endless adjustors that do not incorporate any forms of stops to limit rotation of the adjustor 1350.

The rotary encoder of each adjuster 1350 includes a knob located on the control surface of mixer 106 to allow operation thereof by a user. A user may alter the position of adjuster 1350, for example, to adjust the gain of a microphone connected to a local audio device 102 as discussed in greater detail with respect to FIGS. 5A and 6.

Mixer audio input device port 1318 may be any commercially available analog audio input device port that is compatible with mixer audio input device 1316 and the internal components of mixer 106, and mixer audio input device 1316 may be any type of commercially available analog audio input device such as an analog microphone, an audio feed from another mixer or other audio equipment, etc. The received audio are then buffered and/or amplified by mixer preamp 1324 and are converted from analog to digital form by mixer preamp ADC 1322 such that the audio may be read in digital form by mixer control unit 1310.

Mixer audio input device port 1348 may be any commercially available digital audio input device port that is compatible with a digital audio input device such as audio input device 1349 and the internal components of mixer 106, and mixer audio input device 1349 may be any type of commercially available digital audio input device such as a digital microphone. In some embodiments, for example those using Audio Engineering Society ("AES") audio, a digital receiver 1328 receives the digital data from port 1348 and processes it for delivery to mixer control unit 1310.

In one embodiment, each potentiometer of an adjuster 1350 is electrically coupled to a respective, dedicated adjuster analog-to-digital converter ("ADC") 1314 (See FIG. 4A). However, alternate embodiments are envisioned in which a plurality of Adjuster ADCs 1314 may be multiplexed to receive data from a quantity of adjustors 1350 that is greater than the quantity of Adjuster ADCs without departing from the scope hereof. In turn, each adjuster ADC 1314 is electrically coupled to a dedicated analog input of mixer local control unit 1310. As a user rotates the knob associated with a particular adjuster 1350, the resistance across each potentiometer of adjustor 1350 varies. As the adjuster 1350 moves to the desired position, the respective adjuster ADC 1314 measures the resistance across each potentiometer and converts it to a numeric value to be read by mixer local control unit 1310. The two potentiometer values are compared to each other to determine the numeric value that corresponds to the desired parameter (e.g., input gain, or amplification, of audio, mixing level, etc.) received at mixer 106 and converts it into the proper format suitable to carry out the intended modification (i.e., mixing level control, local gain control, remote gain control, or the like). Adjuster ADC 1314 may be any commercially available analog-to-digital converter such as, but not limited to, a Maxim Integrated Products MAX1202BCAP analog-to-digital converter.

When a user is adjusting input gain, the gain of audio received from audio input device 1316 via audio input device port 1318 may be adjusted via an exemplary gain adjustment circuit such as gain adjustment circuit 1326 as depicted in FIG. 7. When the mixer control unit 1310 receives the desired gain setting from adjuster ADC 1314 as described above, it converts the received setting to a digital command to be transmitted to gain adjustment circuit ("GAC") DAC 1510. The digital command may be derived from a look up table or the like that equates incoming desired gain settings to corresponding GAC DAC 1510 commands. The GAC DAC 1510 receives its digital command and converts it to an analog signal that is applied to one or more GAC LEDs 1512. GAC LEDs 1512 may be any commercially available LEDs such as, but not limited to, a Lumex SML-LX0603SRW LED. The light generated by GAC LEDS 1512 varies based upon the digital command received from mixer local control unit 1310.

The light generated by GAC LEDs 1512, as well as the audio received locally from audio input device 1316 is received by mixer preamp 1324. In this embodiment of the present invention, mixer preamp 1324 is a preamplification circuit. This circuit includes, inter alia, one or more photocells 1514 and a plurality of amplifiers 1516. Photocells 1514 may be any commercially available photocell such as, but not limited to, cadmium sulfide ("CdS") photocells such as Silonex NSL-6112 photoconductive cells. Each photocell 1514 varies its resistance between two terminals based upon the amount of photons it receives. This varying resistance varies the analog signals applied to the input terminals of the plurality of amplifiers 1516 to vary the amplification of the audio received from audio input device 312 as desired by a user of audio processing system 100. The amplified audio, as output by amplifiers 1516, is then transmitted to mixer preamp ADC 1322. Mixer preamp ADC 1322 converts the amplified audio signals to digital form for transmission to mixer control unit 1310. It should be noted that the depicted gain adjustment and preamplification circuits are merely exemplary and any other compatible hardware or software capable of adjusting gain and/or amplifying analog signals may be substituted without departing from the scope of the present invention.

In the depicted embodiment, four (5) adjusters 1350 are provided to facilitate adjustment of settings such as local or remote audio gain, or amplification, and mixing levels. However, a greater or lesser quantity of adjusters 1350 may be provided without departing from the scope of the present invention.

Referring now to FIG. 5A, illustrated is a flow diagram of one exemplary embodiment of a process 500 for assigning one or more audio inputs to one of a set of banks in accordance with one embodiment of the present invention. In the depicted embodiment, the one or more audio inputs may be analog, digital, or wireless without departing from the scope hereof (i.e., a wireless audio input is audio received wirelessly from another device, wherein the other device received the original audio in either analog or digital form).

Process 500 begins at 502. For example, at 502, a sound engineer or other user who wishes to assign audio inputs to one or more banks activates the display of an adjuster assign matrix such as, for example, the matrix 550 depicted in FIG. 5B. The matrix may be displayed, for example, by activating a SHIFT (e.g., pressing and holding the MENU controller) and then pressing the F4 controller (e.g., a pushbutton). Or, for example, it may be displayed by holding the F4 controller for the duration of the button hold time, as may be set by a user. Or, the matrix may be displayed via other manipulation of menu controller 1362. In the depicted embodiment, menu controller 1362 may be, for example, a knob, a button, or a touch screen input, however, the invention is not so limited. Also, alternate displays and methods of assigning inputs to a bank (other than a matrix) may be substituted without departing from the scope hereof. Process 500 then proceeds to 504.

At 504, a user selects the type of input to be routed. In the depicted embodiment, these types include analog, digital, or RX, wherein the RX stands for audio received via wireless transmission from another device such as, but not limited to, a local audio device 102, which are activated by depressing the F9 controller 1364*a*, the F10 controller 1364*b*, or the F11 controller 1364*b*, respectively.

Figure 5B:
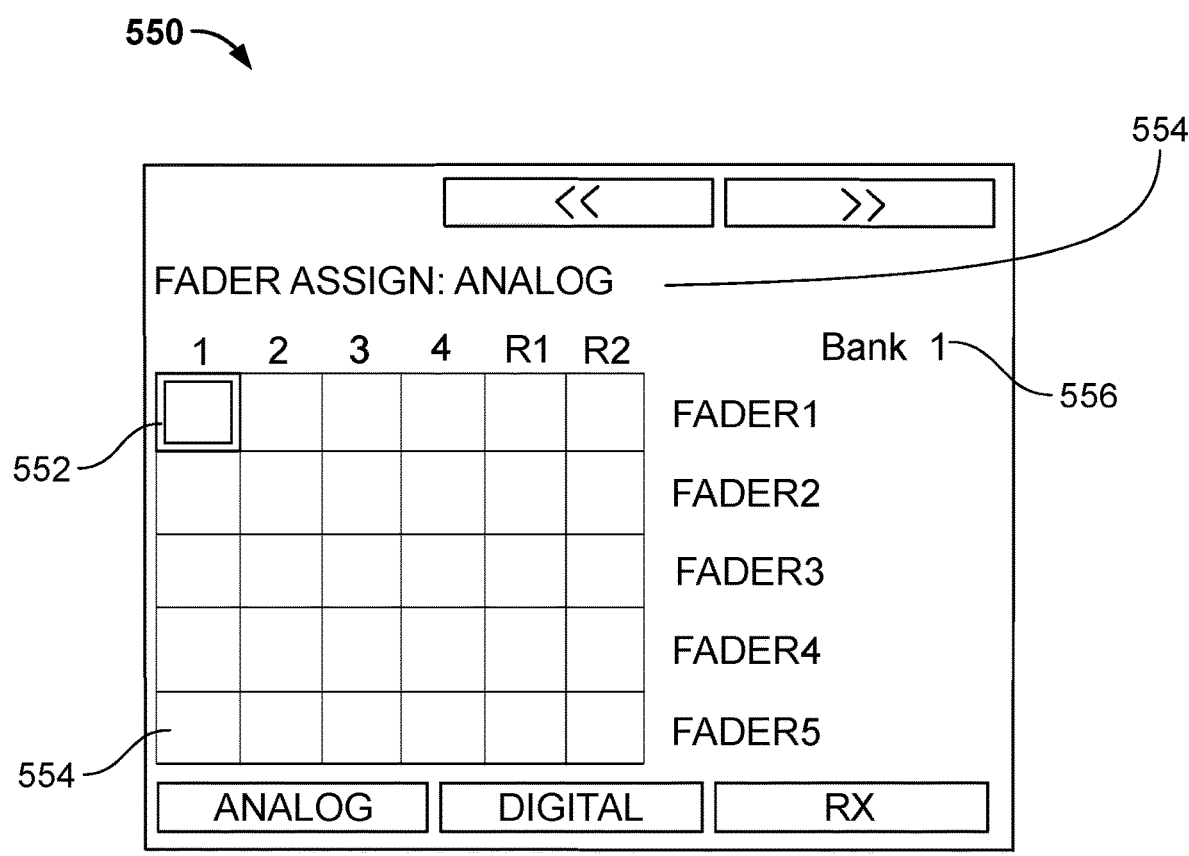
FIG. 5B depicts an exemplary display used to assign one or more audio inputs to one of a set of banks in accordance with one embodiment of the present invention.

Process 500 then proceeds to 506, at which the user uses a knob such as knob 1362 to scroll to the desired crosspoint 554 that matches an input with a fader to which the user wishes to assign the input. For example, as shown in FIG. 5B, crosspoint box 552 is highlighted which would assign analog input 1 to fader 1 in Bank 1. In this image, the user selected analog during step 504, and thus the word "analog" is displayed to the user at 554. However, field 554 varies to depict whatever type of input is selected by the user at 504. The number of the bank for which assignments are being made is also shown at 556. The user may scroll through the various crosspoint boxes by rotating the menu controller 1362. As the user scrolls through the options, the newly selected box will have a darkened border to indicate that it is the currently selected crosspoint and the highlighting of the previously selected box will disappear similar to that shown for unhighlighted crosspoint box 554.

Next, at 508, once the user has selected the desired crosspoint that matches the input to the desired fader and has caused the respective crosspoint box to be highlighted with a darkened border as shown in FIG. 5B for box 552, the user selects the desired crosspoint by pressing the menu controller 1362. At this point the input assigned to the fader is displayed to the user with an option to save. Finally, at step 510, the user saves the selection by pressing the menu controller 1362. Once an assignment has been saved, an X or some other indicator is displayed in the correspondence crosspoint box 554 to indicate that the respective fader has been assigned to one or more inputs. Additionally, the fader display 1360 associated with the fader and the currently selected bank will illuminate to indicate that the fader has been assigned to one or more inputs as described in further detail elsewhere herein.

Although this process is described for the assignment of one audio input to an adjustor 1350, it is envisioned that multiple audio inputs may be assigned to a single adjuster without departing from the scope hereof. In such a scenario, the selection of the audio input would merely facilitate the listing of more than one audio input to be associated with the crosspoint box. Further, it is envisioned that an audio input may be assigned to multiple crosspoint boxes. For example, the same audio input may be assigned to multiple banks to easily and quickly accommodate a change in control by merely pressing the BANK button 1313a to quickly move from a first bank to a second bank.

Next, at 512, if the user wishes to assign additional inputs, the user continues to scroll with the menu controller 1362 and process 500 returns to 504 to assign a new audio input. Otherwise, if the user is done assigning inputs, process 500 proceeds to 514, at which it ends. This can be performed by virtually any other action other than rotation of the menu controller 1362.

After inputs have been assigned to an adjustor or fader, the corresponding box remains filled with an indicator (e.g., an X) to notify the user that the fader is currently assigned to one or more inputs.

In some embodiments of the invention, the user may scroll to a previously assigned input and, once the respective crosspoint box is highlighted, a user may press bank to view the input(s) assigned to the fader of the current bank. If the bank button is pressed twice, the display will cycle to the next bank in numerical order. For example, if the bank controller (e.g., an illuminable pushbutton) is pressed twice while bank 1 is being displayed, a second press of the bank controller will activate a display of bank 2, wherein any inputs that have been previously assigned will appear with a highlighted crosspoint box.

In some embodiments of the invention, a color is assigned to each bank. This color may be pre-assigned or may be selected by the user through manipulation of the menu function. When a particular bank associated with a color is in use during operation of the mixer 106, the lights 1358 of the fader displays 1360 surrounding the adjusters 1350 illuminate in that color to indicate to the user that the corresponding bank is currently being controlled. However, such color coding is not required to implement the systems and methods of the present invention.

FIG. 6 depicts an exemplary process 600 for controlling local mixing level, local input gain, or remote input gain in accordance with one embodiment of the present invention. In the exemplary embodiment, process 600 is executed by mixer local control unit 1310 and begins at 602, at which rotation of an adjuster 1350 is detected. This rotation as well as the adjustor that caused the rotation is read as an input to the mixer control unit 1310 as discussed in greater detail herein. The adjustors 1350 are capable of relaying rotational direction as well as the distance traveled from a random starting point.

Next, process 600 proceeds to 604, at which the control unit receives information regarding the quantity and direction of rotation of the knob in real time as discussed in greater detail herein.

Next, process 600 proceeds to 606, at which it determines the desired action to be taken and the corresponding audio input to be controlled. In the depicted embodiment, the desired action includes: local control of the volume of the audio on the corresponding input as it is input to the mixing algorithm, local control of the gain of the audio as it is received by the mixer 106, and remote control of the gain of the audio as it is received at the local audio unit 102 that is in wireless communication with the mixer 106.

As discussed above in greater detail, in the depicted embodiment of the present invention, each adjuster 1350 is associated with one or more respective audio inputs and these inputs vary depending upon the bank that is currently being controlled by a user. When the mixer 106 is in TRIM mode, the respective adjusters 1350 are modifying the gain of the audio received by the mixer 106. Or, when mixer 106 is set to ZNET mode, the respective adjusters 1350 are modifying the gain of the audio received from the audio input device 314 (FIG. 3A) connected to the local audio device(s) 102 assigned to the particular adjuster 1350. Alternatively, when mixer 106 is not set to ZNET or TRIM mode, the respective adjusters 1350 are modifying the mixing levels of the audio received by mixer 106.

In one embodiment of the present invention, the absolute gain and/or mixing level able to be set by a particular adjuster 1350 is limited to a range of possible values to prevent an erroneous setting that might severely impact the quality of the audio received from a particular microphone. That is, the position of each adjuster 1350 is limited to a value between an absolute lowest value and an absolute highest value depending upon the action correlating to the adjuster value. These limits may be incorporated using a plurality of methods. For example, electrical high and low limits may be applied to adjuster ADC to prevent its output from exceeding, or falling below, predetermined limits. Or, mixer local control unit 1310 may be programmed to override a value received from 1314 when it exceeds, or falls below, a predetermined limit. In such a scenario, mixer local control unit 1310 may defer to a pre-programmed fallback value. Other methods may also be substituted without departing from the scope of the present invention.

TRIM Key 1313b

A quick press of an illuminable TRIM controller 1313b will cause the TRIM controller 1313b to blink. Another press of the TRIM controller 1313b will cause it to de-illuminate. When the controller is blinking, and an adjustor is rotated, the rotation of the adjustor is intended to locally adjust the input gain for the audio input assigned to that adjustor for the current bank. This audio input may be analog (e.g., an analog microphone), digital (e.g., a digital microphone) or RX (e.g., a local audio device 102). That is, if the adjustor being adjusted is adjuster 1, and the current bank is "Bank 1" and an analog microphone coupled to input port 1318 has been assigned as the audio input for adjuster 1, bank 1, then rotation of adjuster 1 while the TRIM controller is blinking will locally cause the input gain of the analog input (e.g., audio from an analog microphone, audio from another mixer or other audio equipment, etc.) to input port 1318 to be adjusted. Although one analog port 1318 is depicted in FIG. 4A, it is understood that a plurality of analog ports may be included without departing from the scope hereof. Similarly, a digital microphone 1349 may be coupled to digital input port 1348 and although one digital input port 1348 is depicted in FIG. 4A, it is understood that a plurality of digital input ports may be included without departing from the scope hereof.

ZNET Key 1313c

A quick press of the illuminable ZNET controller 1313c will cause the ZNET controller 1313c to blink. Another press of the ZNET controller 1313c will cause it to de-illuminate. When the controller is blinking, and an adjustor is rotated, the rotation of the adjustor is intended to remotely adjust the input gain for the local audio device 102 assigned to that adjustor for the current bank. In the depicted embodiment, it is envisioned that each local audio device 102 has a specific and unique identifier (an "ID code"). That is, if the adjustor being adjusted is adjuster 1, and the current bank is "Bank 1" and a local audio device 102 having an ID code of 100 has been assigned as the wireless audio input for adjuster 1, bank 1, then rotation of adjustor 1 while the ZNET controller is blinking is intended to cause the input gain of the remote local audio device 102 having an ID code of 100 to be adjusted. This control will be implemented remotely through the wireless link between mixer 106 and the remote local audio device as discussed in greater detail herein.

Optionally, in some embodiments, when a user presses and holds the ZNET controller 1313c during control of a remote local audio device 102, the internal menu of that remote local audio device 102 is displayed on the display 1363 of the mixer 106 to allow a user of the mixer 106 to adjust additional parameters of the local audio device 102.

If neither of the TRIM Key 1313b and the ZNET Key 1313c are blinking, adjustment of an adjustor 1350 is intended to adjust the mixing level, or volume, of the audio input assigned to the adjustor 1350 for the current bank, as the audio input is mixed with the other audio inputs in a mixing algorithm executed by mixer control unit 1310.

By querying the status of the TRIM Key 1313b and the ZNET controller 1313c, and cross referencing the adjustor number and bank feed with the adjuster assign matrix such as matrix 550, process 600 determines the desired action and the desired audio input(s) to be adjusted.

Process 600 then proceeds to step 608 at which the value desired by the user is adjusted within mixer control unit 1310, for example, in its mixer memory 1308 or RAM in real time.

Next, at 610, the lights 1358 of the fader display 1360 of the respective adjustor 1350 are modified to reflect the change in value saved at step 608 by fulling or partially illuminating each of the lights 1358 in the fader display 1360. That is, in the depicted embodiment, both the color and intensity of lights 1358 are adjusted. The color indicates the current bank that is selected by a user for control. The intensity of the lights 1358 are utilized in multiple ways. First, one or more pointer lights 1358 are incorporated. A pointer light 1358 is a light illuminated to maximum or near maximum brightness, or pointer light illumination level. If one pointer light is illuminated to a pointer light illumination level, this indicates to the user that only one audio input channel is under control. If more than one audio input is under control, each light on either side of the main pointer light 1358 will also be illuminated to pointer light illumination level such that there are a series of three pointer lights 1358 illuminated to pointer light illumination level. This series of three lights will notify the user that more than one audio input is under control.

Additionally the location of the main pointer light 1358 will also indicate the current level of the parameter under control. For example, in one aspect, the main pointer light 1358 being illuminated at the 12 o'clock position (i.e., the highest light 1358 in the orientation of lights 1358), will indicate that the controlled parameter is indexed to a predetermined value as compared to a range of values (e.g., 50% of the range). As the value of the controlled parameter changes, the main pointer light 1358 will change accordingly (e.g., if the value of the controlled parameter changes to 70% of the predetermined range, the light 1358 illuminated as the main pointer light will be the one that is located 70% of the way around the right of lights 1358, when starting from the left, lowest light 1358. The parameter value that corresponds to any specific percentage may be set via a cross reference table or the like programmed in mixer control unit 1310. For example, if an input gain range is −40 dB to 60 dB, a percentage of 50% might be equivalent to a value of 10 dB. However, other methods of assigning a parameter value to the fader display and/or other methods of displaying the parameter value in the fader display may be substituted without departing from the scope hereof.

Furthermore, separate from and in addition to the pointer lights 1358, the fader display of lights 1358 may also be used as a meter. That is, a quantity of lights 1358 will illuminated starting from the left, lower light 1358 around the light display to the corresponding extent of the value of the controlled parameter. In an embodiment in which pointer lights 1358 are also included, the illumination of the lights that are being utilized as the meter will be less than that of the pointer light illumination level, for example, 50% illumination, to allow a user to distinguish between the lights illuminated as a meter and the lights illuminated as pointer(s).

[The intensity of the lights indicates the current control electrical position with lower brightness providing audio metering. Also, if three pointer lights 1358 are illuminated at maximum or near maximum brightness, this indicates that more than one input is assigned to the fader/adjuster. Conversely, if a single point light 1358 is illuminated at maximum or near maximum brightness, this indicates that only one input is assigned to the fader/adjuster.

In the depicted embodiment, the fader display 1360 includes fifteen (15) individual lights 1358 (e.g., LEDs) located to form a circle around the respective adjustor 1350, however, varying forms, quantities, and configurations of light displays may be substituted without departing from the scope hereof. In the depicted embodiment, the lights 1358 are LTSTC19HE1WT as manufactured by Lite-On, however, alternate lights may be substituted without departing from the scope hereof.

In some aspects, the color of the light displays will indicate the bank of audio inputs being controlled, i.e., a first color indicates bank 1, a second color indicates bank 2, etc. When none of the lights 1358 in the fader display 1360 are illuminated, this means that the respective adjustor 1350 is not assigned to an audio input.

Process 600 then proceeds to 612, at which the new value received at step 606 and adjusted at step 608 is routed to the selected destination.

In the case of ZNET mode and a remote audio gain adjustment, the adjustment is made by transmission of the new value through the wireless communication to the local audio device(s) 102, at which it is received by its local receiver 302. Only the local audio device(s) 102 for which the change is intended will change its local values, and all other local audio devices will remain unaffected. Therefore, when the respective adjuster 1350 is rotated and the system is indexed to ZNET mode, it will remotely adjust the gain of the audio received from, for example, audio input device 312 (FIG. 3A) of the local audio device(s) 102 assigned to that particular adjuster 1350.

Figure 2:
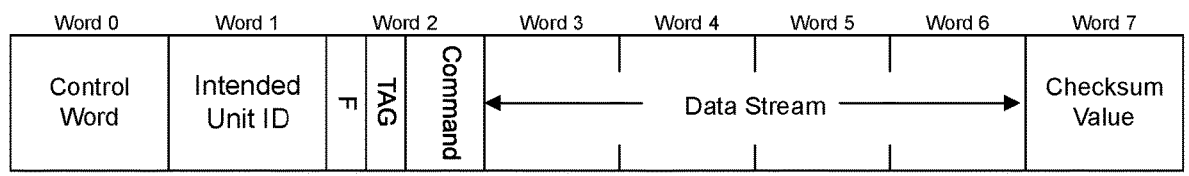
FIG. 2 depicts an exemplary format of a data packet in accordance with one embodiment of the present invention.

More specifically, process 600 combines the value of the gain read from the current adjuster 1350, the unit IDs for the corresponding local audio device(s) 102, and other information to create a data packet for transmission to the corresponding local audio device(s) 102. The other information included in the data packet is described in greater detail below with respect to FIG. 8 and the format of an exemplary data packet is depicted in FIG. 2. To create the data packet, all required data (See FIG. 2) other than the checksum value is sent to a buffer of mixer 106. Then the checksum value is calculated and appended to the data located in the buffer. The data is then transferred to a buffer of transmitter 1382 of mixer 106 (See FIG. 4A) and is thereafter transmitted to the local audio device(s) 102 (as determined during step 714). The data packet is received wirelessly at the corresponding local audio device(s) 102 via its local receiver 302, and it is processed as discussed in greater detail below with respect to FIG. 8. Alternate embodiments of the present invention are envisioned in which data is transmitted via a different method.

Or, if the system is set to TRIM mode for the local audio gain adjustment for one or more audio inputs as they are received directly at the mixer 106. On mixer 106, one or more adjusters 1350 have corresponding audio inputs which have been assigned to it. When the mixer 106 is indexed to TRIM mode, it will locally adjust the gain of the audio inputs assigned to the adjustor that was rotated as they are received by mixer 106. To do this, the gain value for the corresponding audio input is adjusted to the new value read from the current adjuster 1350. The gain may be adjusted in any one of a variety of ways including but not limited to, via software, via a gain adjustment circuit such as gain adjustment circuit 1326, etc. Also, gain may be adjusted incrementally (i.e., in upward and downward steps) rather than absolutely (i.e., setting gain to a specific value) without departing from the scope of the present invention. Thereafter, the new gain value is stored.

Or, if the system is set to neither TRIM nor ZNET mode, then the mixing levels of the one or more audio inputs as they are input into the multitrack soundtrack may be adjusted by adjustors 1350. On mixer 106, one or more adjusters 1350 have corresponding audio inputs which have been assigned to it. When the mixer 106 is indexed to neither TRIM nor ZNET mode, it will locally adjust the mixing level of the audio inputs assigned to the adjustor that was rotated. To do this, process 600 adjusts the mixing level value for the corresponding audio inputs to the new value read from the current adjuster 1350. The mixing level may be adjusted in any one of a variety of ways including but not limited to, via software. Also, mixing levels may be adjusted incrementally (i.e., in upward and downward steps) rather than absolutely (i.e., setting gain to a specific value) without departing from the scope of the present invention. Thereafter, the new mixing level value is stored.

Thereafter, the process 600 ends at 614 and may be re-initiated by moving any one of the adjustors 1350. Process 600 is executed whenever mixer 106 is receiving power via mixer power supply 1306 as described above.

Although mixer 106 of the depicted embodiment includes an internal recorder for recording the mixed audio inputs received from each of the audio input devices, an internal recorder is not required to implement the systems and methods of the present invention.

Figure 8:
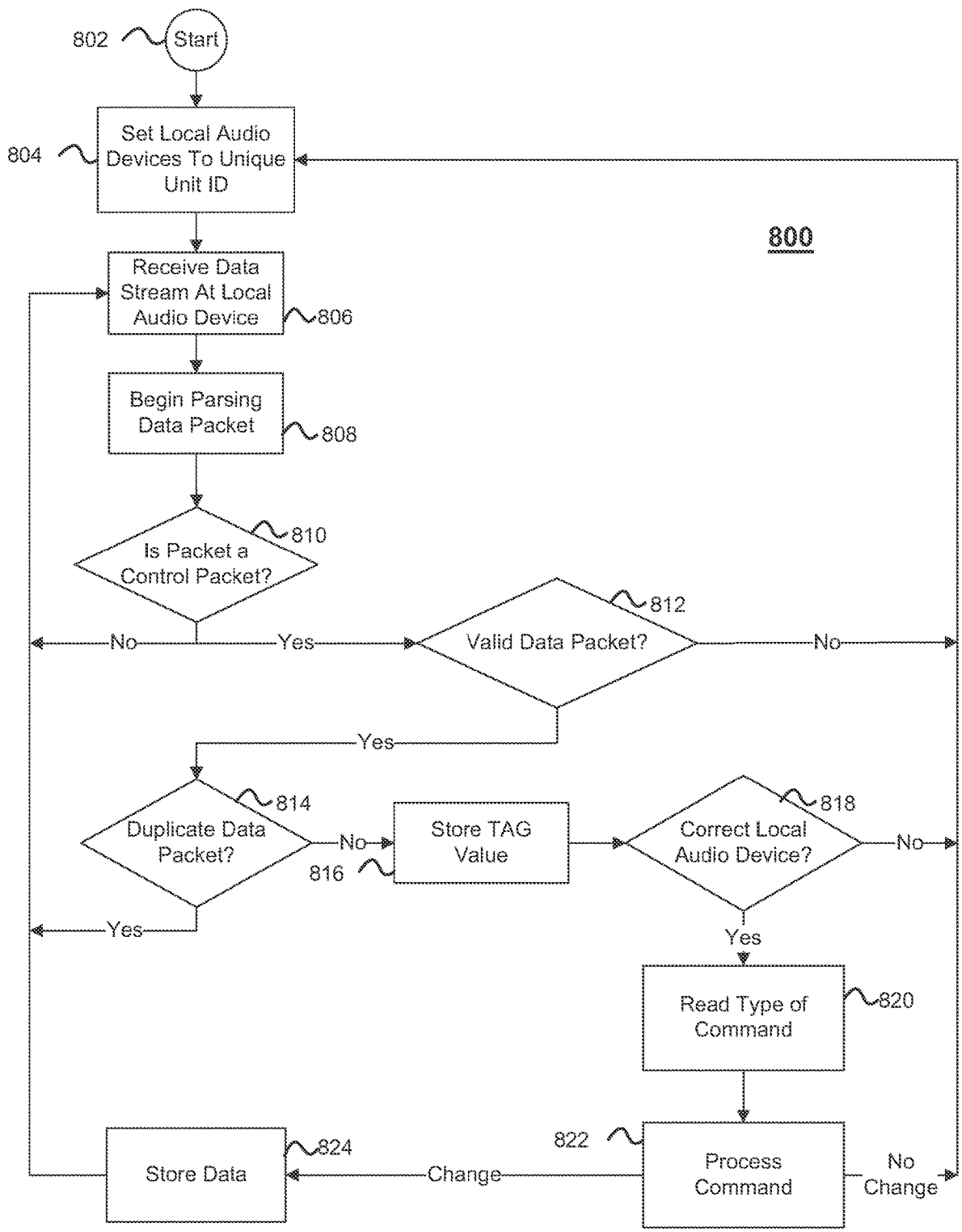
FIG. 8 depicts a process for receiving commands at one or more local audio devices.

Referring now to FIG. 8, depicted is a process 800 for receiving and executing commands at one or more local audio devices 102. Specifically, the exemplary process depicted in FIG. 8 depicts a method for remotely controlling a specific local audio device 102. A process such as exemplary process 800 is executed by local control unit 310 (See FIG. 3A) of local audio device 102 whenever the device is receiving power via local power supply 306. Process 800 is executed in sequence with the other processes performed by local control unit 310 as described in greater detail above.

Process 800 begins at 802 and proceeds to step 804. At 804, all local audio devices 102 are indexed to a unique unit ID. Indexing of a unit ID for a particular local audio device 102 may be performed, for example, locally by a user via manipulation of its respective keypad 320 or remotely via mixer 106 as discussed in greater detail herein. As also discussed above, the unit ID identifies the specific one of multiple local audio devices 102 that a user wishes to control. Setting the unit ID to a unique value ensures that the control signals transmitted by mixer 106 are received by the correct and intended local audio device(s) 102. That is, since each adjuster 1350 is assigned to one or more local audio device(s) 102 having unique unit IDs, mixer 106 is programmed to transmit gain adjustments performed via a particular adjuster 1350 to the local audio device(s) 102 having the unit ID(s) to which the particular adjuster 1350 has been assigned. Or, alternatively, multiple local audio devices 102 may be assigned an identical unit ID code in order to provide an additional method in which several local audio devices 102 may be controlled with the same commands simultaneously as a group.

Next, process 800 proceeds to step 806, at which a specific one of the local audio devices 102 receives a data stream via its local receiver 302 in a manner discussed in greater detail above with reference to FIG. 3B. Although steps 806 through 824 will be discussed with respect to a specific one of the local audio devices 102, all local audio devices simultaneously and independently perform these steps in the same manner.

In the embodiment of the present invention depicted in FIGS. 1-10, the data stream received at the local audio device 102 includes a plurality of binary data packets that are sixteen (16) bytes in length. In one embodiment, the data stream is sent by mixer 106's transmitter 1382 (as discussed in greater detail above with respect to FIG. 4A) at a rate of 1000 data packets per second via 2.4 GHz RF transmission. However, alternate embodiments of the present invention are envisioned in which the data stream is sent by at a different rate of packets per second and/or a different frequency.

At step 808, process 800 begins parsing each data packet of the data stream received by local transmitter 308. The data packets are sixteen (16) bytes in length and are comprised of a plurality of 16 bit words. That is, each data packet is a string of binary digits 128 characters in length divided into eight segments that are sixteen (16) bits (i.e., sixteen digits) or two (2) bytes in length. Local control unit 310 parses each segment of sixteen (16) digits as a word. As illustrated in FIG. 2, one exemplary data packet includes eight word lengths of data and each word communicates specific information to local control unit 310 as further discussed below.

Process 800 then proceeds to 810, at which it determines if the data packet is a control packet by parsing the first word of the data packet (i.e., word #0). The first word serves as a control word to indicate if the data packet is a control packet or some other packet including, but not limited to, a timecode packet (i.e., a packet utilized to transmit a master timecode between components of audio processing system 100) or an audio packet (i.e., a packet utilized to transmit audio between components of audio processing system 100). If all of the bits in word #0 are zero (0), then the data packet is a timecode packet and its purpose is to transmit a master timecode to local audio device 102. If all of the bits in word #0 are one (1), then the data packet is a control packet and its purpose is to remotely control one or more functions of local audio device 102 as described in greater detail herein. Alternatively, if the bits of word #0 are some combination of zeros (0) and ones (1), then the data packet is an audio packet and it is placed in an audio first in first out ("FIFO") queue and sent to a decompression routine. At step 810, if word #0 of the data packet does not indicate that it is a control packet, process 800 returns to step 806 to parse the next data packet in the received data stream and the timecode or audio packet is processed by a separate process (not shown) executed by local control unit 310.

Alternatively, if step 810 determines that the data packet is a control packet, process 800 proceeds to step 812. At step 812, process 800 determines whether the data packet is a valid data packet. In the depicted embodiment, the validity of the data packet is verified by reading the eighth word (i.e., word #7) of the data packet. Word #7 includes a checksum value which is a value used to ensure data within the data packet has been transmitted without error. The checksum value is created by calculating the binary values in a block of data using a predetermined algorithm and storing the result with the data. When the data is received by local audio device 102, process 800 calculates a new checksum using the same predetermined algorithm and compares the calculated result to the checksum value. If the calculated result does not match the checksum value, an error has occurred that has affected the validity of the data packet. An invalid data packet may occur, for example, if data is lost during RF transmission or if an error occurs in assembly of the data packet by mixer 106. In such a scenario, process 800 discards the data packet (i.e., it does not continue processing the data packet and it takes no action relative to the data packet) and returns to step 806 to parse the next data packet in the received data stream. In some aspects of the invention, the checksum may be a Cyclic Redundancy Check ("CRC") value calculated using a binary polynomial without departing from the scope hereof.

Alternatively, if, at 812, the data packet is found to be valid because the calculated result matches the checksum value, process 800 proceeds to 814. Although the depicted embodiment of the present invention utilizes a checksum method of validating the data packet, other methods including, but not limited to, the CRC method may be substituted without departing from the scope of the present invention.

At step 814, process 800 determines if the data packet is a duplicate data packet that has previously been received and processed by local audio device 102. In the depicted embodiment of the present invention, all control data packets are transmitted two or more times to ensure reception by the intended local audio device 102. For instance, if a control data packet is received with an incorrect check sum as described in the previous step, it is discarded and its command is not processed by local control unit 310. Therefore, multiple transmissions of identical control data packets facilitate the likelihood that the intended local audio device 102 receives and processes all command data packets. Process 800 incorporates a tag value to identify duplicate data packets. That is, the tag value for each new control data packet is incremented while each duplicate control data packet has an identical tag value to its original control data packet. In the depicted embodiment of the present invention, the third word (i.e., word #2) of each command data packet indicates the tag value. The first nibble of this word is always equal to F and the second nibble of this word is set equal to the tag value. The first nibble of this word is set to F as a placeholder. That is, the value of F simply fills this portion of the word until it takes on a specific purpose in future upgrades of the invention.

Process 800 reads the second nibble (i.e., bits 5-8) of the third word of the control data packet and compares the tag value to the tag value of the previously received control packet. If the tag value of the current control data packet is identical to the tag value of a previously received control data packet, process 800 discards the control data packet (i.e., it does not continue processing the data packet and it takes no action relative to the data packet) and returns to step 806 to parse the next data packet in the received data stream. Alternatively, if, at 814, the data packet is found to be a new control data packet having a different tag value than the previously processed data packet, process 800 proceeds to 816. Although the depicted embodiment of the present invention utilizes a tag value method of identifying duplicated control data packets, other methods may be substituted without departing from the scope of the present invention.

At 818, process 800 determines if the control data packet includes a command for the specific local audio device 102 processing the control data packet. That is, process 800 reads the second word (i.e., word #1) of the control data packet to determine the unit ID of the local audio device 102 for which the control data packet is intended. The read unit ID is compared to the unit ID of the local audio device 102 processing the control data packet to determine if they are identical. If yes, the control data packet is intended for the processing local audio device 102 and it is processed. If no, the control data packet is intended for another local audio device 102 and it is discarded. Every data packet received by a single local audio device 102 may not be applicable to that device. For example, if a gain adjustment is made at adjuster 1350 and the local audio device 102 receiving the control data packet is not assigned to that particular adjuster 1350, then the control data packet is not intended for that local audio device 102 and it is discarded.

If it is determined that the control data packet is intended for a different local audio device 102 than the one processing the control data packet, process 800 discards the data packet (i.e., it does not continue processing the data packet and it takes no action relative to the data packet) and returns to step 806 to parse the next data packet in the received data stream. Alternatively, if, at 818, it is determined that the received control data packet is intended for the processing local audio device 102, process 800 proceeds to 820. Although the depicted embodiment of the present invention utilizes a comparison method of ensuring the received control data packet is intended for the processing local audio device 102, other methods may be substituted without departing from the scope of the present invention.

Next, at step 820, process 800 determines what type of command is to be performed. Process 800 determines the type of command by reading the last byte of word #2. For example, if the last byte of word #2 is UBCMD_GAIN, then the command is a gain adjustment command. In this scenario, the data in the data string contained in words #3 through #6 indicates the absolute numerical value of the new gain setting, and the data string is null terminated to indicate the end of the string. Once process 800 has read the type of command, process 800 proceeds to 822 to further process the command.

At 822, the command read in step 820 is processed. The steps involved in processing the command will vary based upon the type of command. In our exemplary embodiment in which the command is an adjust gain command, the new gain value contained in the data string of the current data packet is compared to the existing gain value stored in memory 332 of the respective local audio device 102. If the two values are identical, no adjustment is required and process 800 returns to step 806 to parse the next data packet in the received data stream. Alternatively, if, at 822, it is determined that the new gain value is different from the existing gain value stored in memory 332 of the respective local audio device 102, the gain value for the respective local audio device 102 is adjusted to the new value received wirelessly in steps 806 through 820. The gain is adjusted by extracting the gain change byte (i.e., the byte of data associated with word #3) from the data string and converting it to a voltage to be transmitted to gain adjustment circuit 1326 as discussed in greater detail above with respect to FIG. 3A. The voltage to which it is converted may be obtained from a look up table or the like that correlates the value in the gain change byte to a specific voltage that will affect the desired gain change. However, alternate methods of adjusting gain may be substituted without departing from the scope of the present invention. Also, gain may be adjusted incrementally (i.e., in upward and downward steps) rather than absolutely (i.e., setting gain to a specific value) without departing from the scope of the present invention.

After the command is processed, process 800 proceeds to 824 at which data associated with the processed command, if any, is stored in memory 332. In our gain adjustment example, the new gain value is stored for comparison with new gain values received at a later time. Process 800 then returns to 806 to parse the next data packet in the received data stream.

In the depicted embodiment of the present invention, commands other than a UBCMD_GAIN may be incorporated in a command data packet for receipt and processing by an intended local audio device 102. For example, three such commands include the UBCMD_SCENE, UBCMD_TAKE and UBCMD_REEL commands. These commands transmit the name of the scene, the take number, or the reel number from mixer 106 to the intended local audio device 102. The name of the scene is the title of the scene as determined by a producer or other production personnel. The take number is the numerical designator that identifies the current take being filmed. The reel number indicates the numerical designator that identifies the medium upon which the video being filmed is recorded (e.g., a reel, CD, DVD, etc.). When this information is transmitted to the local audio devices 102, they can incorporate the data in audio packets to facilitate later identification of the audio packet and/or matching of the audio packet to the appropriate video data. That is, since the video being recorded simultaneously with the audio is labeled with scene, take, and reel identifiers, labeling recorded audio with the same identifiers allows the video and audio to be more easily combined post-recording.

After process 800 reads a UBCMD_SCENE, UBCMD_TAKE or UBCMD_REEL command at step 820, it proceeds to step 822, at which it processes this command. Processing of the command includes reading the data included in the data string to determine the name or number of the scene, take, or reel, respectively. Process 800 then proceeds to 824, at which the read data is saved to memory 332 in a predetermined location associated with the particular data to be saved thereto. Once the data is saved to the predetermined location, process 800 returns to 806 to parse the next data packet in the received data stream. Saving of the scene, take, and/or reel data to memory 332 allows the process executed by local control unit 310 in which audio packets are created to retrieve the data during the audio packet creation process for incorporation in the audio packet.

Another exemplary command that may be incorporated in a command data packet for receipt and processing by an intended local audio device 102 is UBCMD_SEGNUM. This command transmits the numerical designator that identifies the audio segment to the intended local audio device 102. However, other methods of assigning numerical identifiers may be substituted without departing from the scope of the present invention.

After process 800 reads a UBCMD_SEGNUM command at step 820, it proceeds to step 822, at which it processes this command. Processing of the command includes reading the data included in the data string to determine the segment number. Process 800 then proceeds to 824, at which the read data is saved to memory 332 in a predetermined location associated with the current segment number. Once the data is saved to the predetermined location, process 800 returns to 806 to parse the next data packet in the received data stream. Saving of the segment number to memory 332 allows the process executed by local control unit 310 in which audio packets are created to retrieve the data during the audio packet creation process for incorporation in the audio packet.

Yet another exemplary command that may be incorporated in a command data packet for receipt and processing by an intended local audio device 102 is UBCMD_TRANSPORT. This command transmits the transport mode of a local audio device 102 to the intended local audio device 102. In the depicted embodiment of the present invention, the transport mode may be play, record, or stop. The transport mode is determined by a user of audio mixer 106. However, other methods of assigning a transport mode to a local audio device 102 such as, but not limited to, automatically assigning such modes may be substituted without departing from the scope of the present invention.

After process 800 reads a UBCMD_TRANSPORT command at step 820, it proceeds to step 822, at which it processes this command. Processing of the command includes reading the data included in the data string to determine the whether the transport mode is play, record, or stop. Process 800 then proceeds to 824, at which the read data is saved to memory 332 in a predetermined location associated with the current transport mode. Once the data is saved to the predetermined location, process 800 returns to 806 to parse the next data packet in the received data stream. Saving of the segment number to memory 332 allows a process executed by local control unit 310 in which transport mode is required to retrieve the data during execution of the process to allow the process to execute in accordance with the current transport mode.

UBCMD_CHANNEL is another exemplary command that may be incorporated in a command data packet for receipt and processing by an intended local audio device 102. This command transmits the frequency at which the receiving local audio device 102 should operate. In the depicted embodiment of the present invention, this frequency is transmitted as a four digit value. For example, a frequency of 5555 indicates that the desired RF frequency is 555.5 MHz. The desired frequency is determined by a user of audio processing system 100 based upon the frequency at which the least interference will be encountered. However, other methods of assigning a frequency to a local audio device 102 such as, but not limited to, automatically assigning such frequencies may be substituted without departing from the scope of the present invention.

After process 800 reads a UBCMD_CHANNEL command at step 820, it proceeds to step 822, at which it processes this command. Processing of the command includes reading the data included in the data string to determine the desired frequency. Local control unit 310 transmits a numerical value corresponding to the desired frequency to a direct digital synthesizer ("DDS"). The DDS compares the received frequency data to the existing frequency at which the local audio device 102 is operating. If they are equal, no change is made. If they vary, the DDS adjusts the frequency at which local transmitter 308 is operating via a phase-locked loop.

Process 800 then proceeds to 824, at which the new frequency data is saved to memory 332 in a predetermined location associated with operating frequency. Once the data is saved to the predetermined location, process 800 returns to 806 to parse the next data packet in the received data stream. Once the data is saved to the predetermined location, process 800 returns to 806 to parse the next data packet in the received data stream.

Although several processes have been disclosed herein as software, it is appreciated by one of skill in the art that the same processes, functions, etc. may be performed via hardware or a combination of hardware and software. Similarly, although the present invention has been disclosed with respect to wireless systems, these concepts may be applied to hardwired systems and hybrid hardwired and wireless systems without departing from the scope of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A mixer device for efficiently processing multitrack audio comprising:
at least one audio input port for receiving local audio from an audio input device as at least one local audio input;
a memory;
a user interface, the user interface including:
at least one adjuster;
at least one control unit electrically coupled to a receiver, a transmitter; said at least one audio input port, said memory, and said user interface; the at least one control unit programmed to control local gain of the local audio and local mixing; and
an adjuster display, the adjuster display including a plurality of lights surrounding the adjuster;
wherein at least one of a color, an intensity, and combinations thereof of the plurality of lights are varied depending upon a selected bank and a value of the adjuster.

2. A device according to claim 1,
wherein the user interface includes at least one indexing controller, the at least one indexing controller used to select a mode of operation, the mode of operations including control of the local gain of the local audio and control of the local mixing.

3. A device according to claim 2, wherein the at least one indexing controller is an illuminable pushbutton.

4. A device according to claim 1, wherein a quantity of the lights surrounding the adjustor is greater than five.

5. A device according to claim 1, wherein an orientation of the lights surrounding the adjustor is circular.

6. A device according to claim 1, wherein the adjuster includes a rotary encoder including a knob and two potentiometers.

7. A device according to claim 6, wherein the rotary encoder is endless.

8. A device according to claim 1,
a receiver adapted to receive remote audio as at least one remote audio input; and
a transmitter adapted to transmit commands;
wherein the at least one control unit is programmed to control remote gain of the remote audio in addition to the local gain of the local audio and the local mixing.

9. A mixer device for efficiently processing multitrack audio comprising:
at least one audio input port for receiving local audio from an audio input device as at least one local audio input;
a memory;
a user interface, the user interface including:
at least one adjuster; and
at least one control unit electrically coupled to a receiver, a transmitter; said at least one audio input port, said memory, and said user interface; the at least one control unit programmed to control local gain of the local audio and local mixing;
wherein the at least one control unit is programmed to provide an adjustor assignment matrix to a user, the adjustor assignment matrix adapted to allow the user to assign one or more of the at least one local audio input to specific ones of the at least one adjustor;
wherein the user interface includes a display adapted to display the adjustor assignment matrix to a user; and
wherein the user interface includes a menu controller adapted to control assignments made by the user via the adjustor assignment matrix.

10. A device according to claim 9, wherein the at least one control unit is programmed to retain adjustor assignments for at least one bank, and wherein the at least one local audio input assigned to a specific one of the at least one adjustor varies depending upon the at least one bank selected by the user.

11. A mixer device for efficiently processing multitrack audio comprising:
at least one audio input port for receiving local audio from an audio input device as at least one local audio input;
a memory;
a user interface, the user interface including:
at least one adjuster;
at least one control unit electrically coupled to a receiver, a transmitter; said at least one audio input port, said memory, and said user interface; the at least one control unit programmed to control local gain of the local audio and local mixing; and
an adjuster display, the adjuster display including a plurality of lights surrounding the adjuster;
wherein the adjuster includes a rotary encoder including a knob and two potentiometers;
wherein the potentiometers are ninety degrees out of phase.

12. A mixer device for efficiently processing multitrack audio comprising:
- at least one audio input port for receiving local audio from an audio input device as at least one local audio input;
- a memory;
- a user interface, the user interface including:
  - at least one adjuster;
- at least one control unit electrically coupled to a receiver, a transmitter; said at least one audio input port, said memory, and said user interface; the at least one control unit programmed to control local gain of the local audio and local mixing;
- a receiver adapted to receive remote audio as at least one remote audio input; and
- a transmitter adapted to transmit commands;
- wherein the at least one control unit is programmed to control remote gain of the remote audio in addition to the local gain of the local audio and the local mixing; and
- wherein an adjustor assignment matrix is adapted to allow the user to assign one or more of the at least one remote audio input, one or more of the at least one local audio input, and combinations thereof to the at least one adjustor.

13. A device according to claim 12, wherein the at least one control unit is programmed to retain adjustor assignments for at least one bank, and wherein the at least one local audio input, the at least one remote audio input, and combinations thereof assigned to a specific one of the at least one adjustor varies depending upon the at least one bank selected by the user.

14. A mixer device for efficiently processing multitrack audio comprising:
- at least one audio input port for receiving local audio from an audio input device as at least one local audio input;
- a memory;
- a user interface, the user interface including:
  - at least one adjuster;
- at least one control unit electrically coupled to a receiver, a transmitter; said at least one audio input port, said memory, and said user interface; the at least one control unit programmed to control local gain of the local audio and local mixing;
- a receiver adapted to receive remote audio as at least one remote audio input; and
- a transmitter adapted to transmit commands;
- wherein the at least one control unit is programmed to control remote gain of the remote audio in addition to the local gain of the local audio and the local mixing; and
- wherein the user interface includes at least two indexing controllers, the at least two indexing controllers used to select a mode of operation, the mode of operations including control of the local gain of the local audio, control of the remote gain of the remote audio, and control of the local mixing.

* * * * *